(12) United States Patent
Hirata

(10) Patent No.: US 10,265,750 B2
(45) Date of Patent: Apr. 23, 2019

(54) PRESS DIE APPARATUS

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 517 days.

(21) Appl. No.: 15/179,605

(22) Filed: Jun. 10, 2016

(65) Prior Publication Data
US 2016/0361744 A1 Dec. 15, 2016

(30) Foreign Application Priority Data
Jun. 15, 2015 (JP) .................................. 2015-120385

(51) Int. Cl.
| | | |
|---|---|---|
| B21D 37/02 | (2006.01) | |
| B21D 13/02 | (2006.01) | |
| H01M 8/0202 | (2016.01) | |
| B21D 37/10 | (2006.01) | |
| B21D 37/18 | (2006.01) | |

(52) U.S. Cl.
CPC ............. B21D 13/02 (2013.01); B21D 37/10 (2013.01); B21D 37/18 (2013.01); H01M 8/0202 (2013.01)

(58) Field of Classification Search
CPC ........ B21D 13/02; B21D 37/10; B21D 37/18; B21D 37/02; H01M 8/0202
See application file for complete search history.

(56) References Cited

U.S. PATENT DOCUMENTS

| | | | |
|---|---|---|---|
| 2014/0352394 A1* | 12/2014 | Hirata .................... | B21D 37/02 |
| | | | 72/478 |
| 2014/0352395 A1* | 12/2014 | Hirata .................... | B21D 37/02 |
| | | | 72/478 |
| 2015/0290692 A1 | 10/2015 | Hirata et al. | |

FOREIGN PATENT DOCUMENTS

| | | |
|---|---|---|
| JP | H04-200934 | 7/1992 |
| JP | 2014-087823 | 5/2014 |
| JP | 2014-213343 | 11/2014 |

OTHER PUBLICATIONS

Japanese Office Action in counterpart application No. JP2015-120385, dated Nov. 27, 2018 (along with English-language translation).

* cited by examiner

*Primary Examiner* — David B Jones
(74) *Attorney, Agent, or Firm* — Greenblum & Bernstein, P.L.C.

(57) ABSTRACT

A press die apparatus includes a die block and a punch. The die block includes a first shaping face, which is constituted by first die segments. The punch includes a second shaping face, which is constituted by second die segments. Any two first die segments that are adjacent to each other contact each other at first contacting surfaces. Any two second die segments that are adjacent to each other contact each other at second contacting surfaces. The first contacting surface of each of two first die segments that contact each other has a first communicating groove, which communicates with the first shaping face. The second contacting surface of each of two second die segments that contact each other has a second communicating groove, which communicates with the second shaping face.

6 Claims, 8 Drawing Sheets

PRESS DIE APPARATUS

BACKGROUND OF THE INVENTION

The present invention relates to a press die apparatus, which includes a pair of dies for pressing a metal plate and is used to form, for example, separators for fuel cells.

As a separator for fuel cells (hereinafter, referred to as a separator), the one illustrated in FIG. 8 has been known (for example, refer to Japanese Laid-Open Patent Publication No. 2014-213343).

Figure 8:
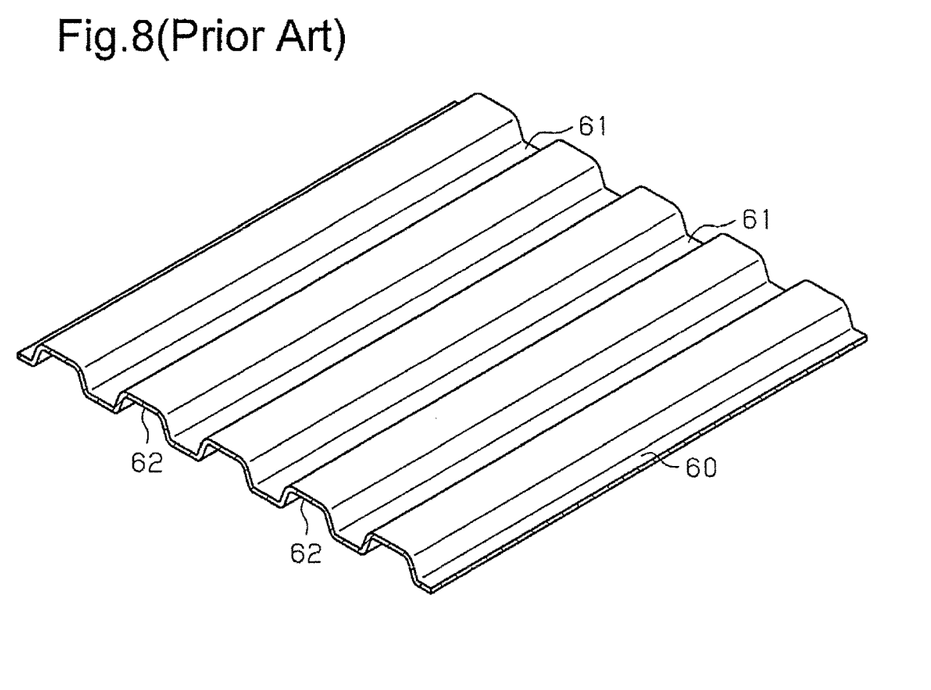
FIG. 8 is a partial perspective view showing a separator for a fuel cell.

As shown in FIG. 8, a separator is constituted by a metal plate 60, which is made of, for example, titanium and has a thickness of several tens to a hundred and several tens of micrometers. The metal plate 60 has first grooves 61 on the top surface at a predetermined interval. The metal plate 60 also has second grooves 62 on the bottom surface at the predetermined interval. Each second groove 62 is arranged between adjacent two of the first grooves 61. The grooves 61, 62 of the metal plate 60 respectively constitute gas passages for fuel gas (for example, hydrogen) and gas passages for oxidation gas (for example, air).

Figure 9:
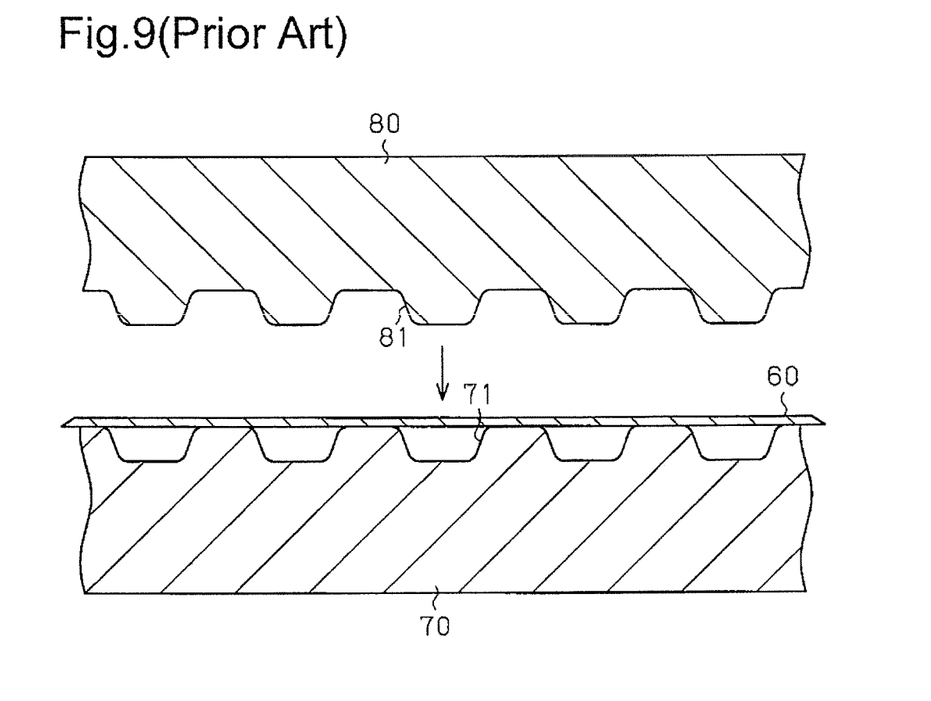
FIG. 9 is a cross-sectional view illustrating a conventional press die apparatus.

When forming such a separator, a press die apparatus as shown in FIG. 9 is used conventionally, for example. The press die apparatus includes a die block 70 and a punch 80. The die block 70 has a corrugated first shaping face 71 on the top surface. The punch 80 has a corrugated second shaping face 81 on the bottom, which corresponds to the first shaping face 71 of the die block 70. The punch 80 is selectively brought closer to and separated from the die block 70. With a metal plate 60 placed on the first shaping face 71 of the die block 70, the punch 80 is moved toward the die block 70. Accordingly, the metal plate 60 is pressed between the die block 70 and the punch 80, so that the first grooves 61 and the second grooves 62 are formed on the metal plate 60.

Conventionally, in a pressing operation performed with the press die apparatus, machining oil is applied to the shaping faces 71, 81 of the die block 70 and the punch 80 to reduce friction between contacting surfaces of the die block 70 and the punch 80 and the metal plate 60, thereby protecting the die block 70, the punch 80, and the metal plate 60 from cracking, scratches, and galling.

When pressing a thin metal plate such as a separator, the following drawbacks are caused. That is, when the machining oil between the metal plate 60 and the shaping faces 71, 81 of the die block 70 and the punch 80 is pressurized by the pressure of the pressing operation, the fluid pressure of the machining oil may be locally increased. In such a case, the metal plate 60 may have defects in shaping. For example, the metal plate 60 may be ripped or have spring back.

SUMMARY OF THE INVENTION

Accordingly, it is an objective of the present invention to provide a press die apparatus that readily limits the occurrence, of defects in shaping even when pressing a thin metal plate.

To achieve the foregoing objective and in accordance with one aspect of the present invention, a press die apparatus for pressing a metal plate is provided. The apparatus includes a first die and a second die. The first die is configured by a plurality of first die segments arranged side by side. The first die has a first shaping face constituted by the first die segments. The second die is configured by a plurality of second die segments arranged side by side. The second die has a second shaping face constituted by the second die segments. Each first die segment includes a first contacting surface, which contacts adjacent one of the first die segments. Each second die segment includes a second contacting surface, which contacts adjacent one of the second die segments. The first die segments include a plurality of pairs of first die segments. The first die segments in each pair contact each other at the first contacting surfaces. The first contacting surface of at least one of each pair of the first die segments has a first communicating groove, which communicates with the first shaping face. The second die segments include a plurality of pairs of second die segments. The second die segments in each pair contact each other at the second contacting surfaces. The second contacting surface of at least one of each pair of the second die segments has a second communicating groove, which communicates with the second shaping face.

DETAILED DESCRIPTION OF THE PREFERRED EMBODIMENTS

One embodiment will now be described with reference to FIGS. 1 to 7.

The press die apparatus according to the present embodiment is used to form a separator for a fuel cell.

Figure 1:
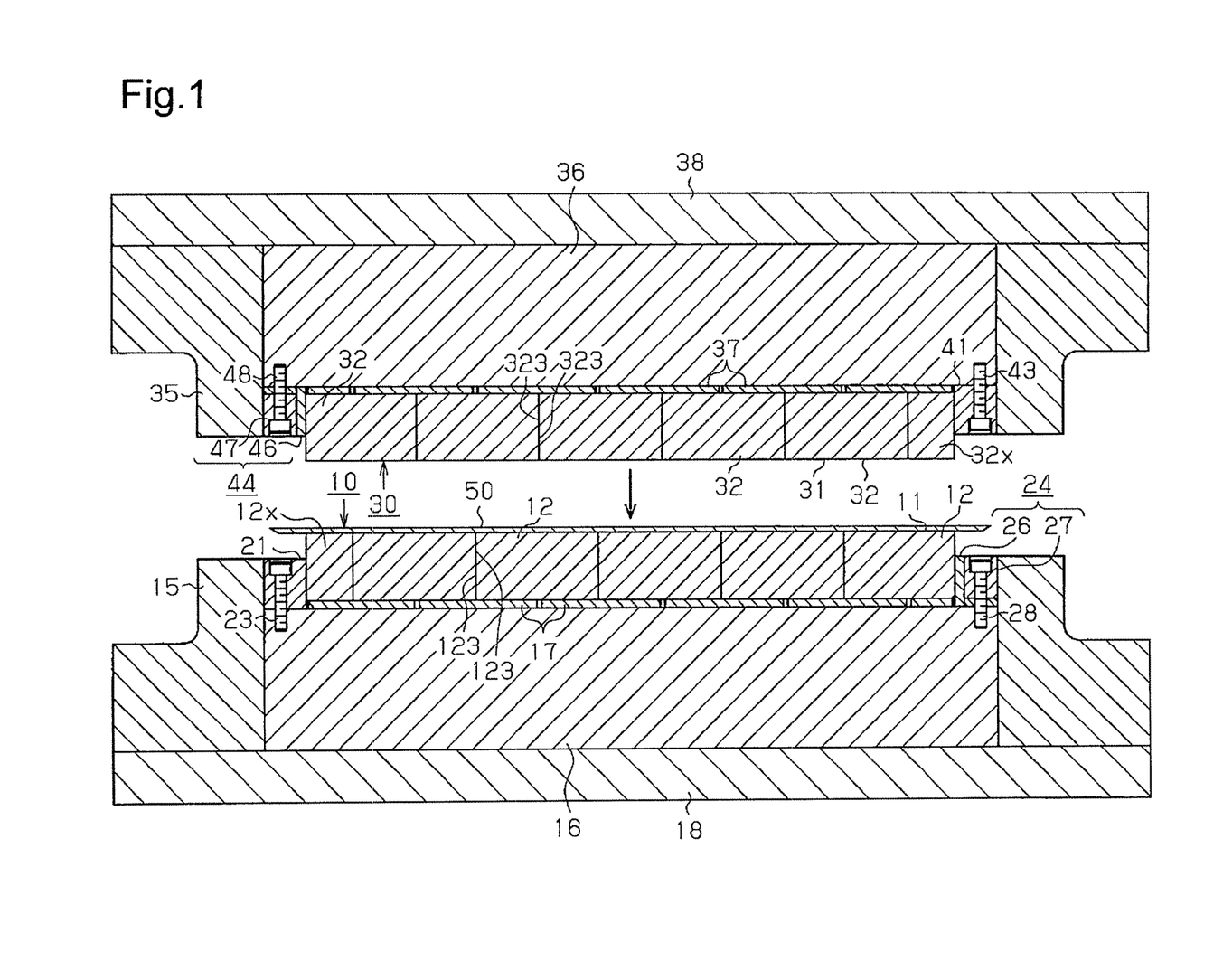
FIG. 1 is a cross-sectional view of a press die apparatus according to one embodiment, illustrating a die block and a punch used in a first step.
Figure 2:
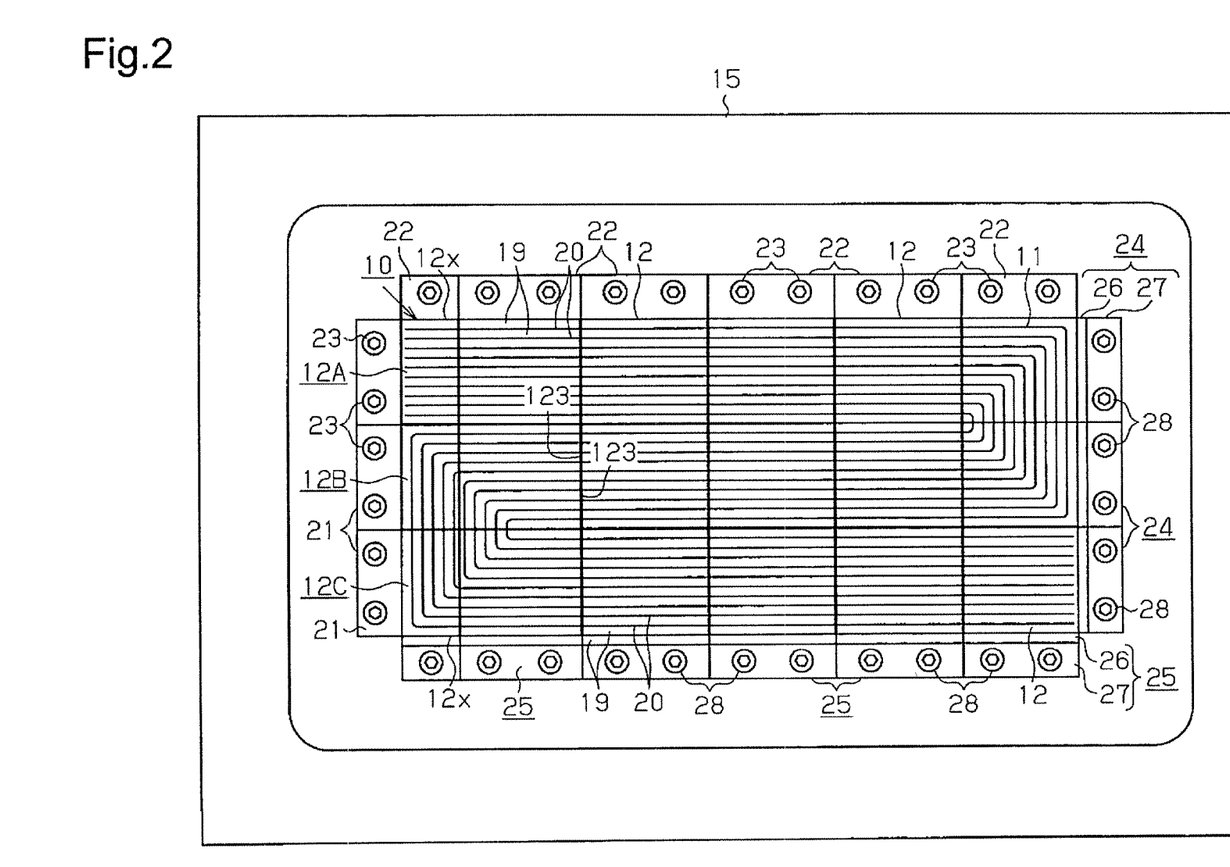
FIG. 2 is a plan view of the die block shown in FIG. 1.
Figure 3:
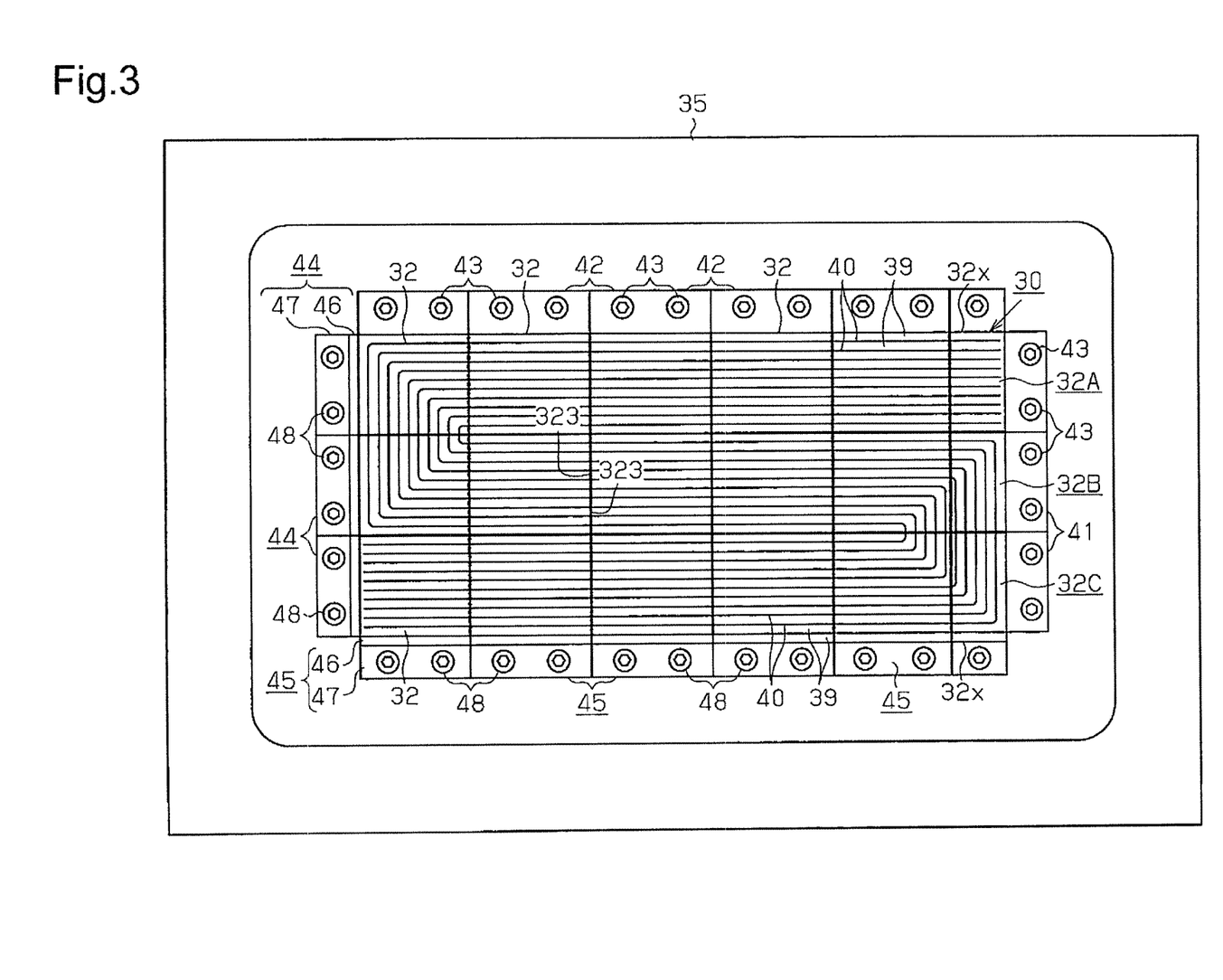
FIG. 3 is a plan view of the punch shown in FIG. 1.

When a metal plate 50 is processed using the press die apparatus of the present embodiment, the metal plate 50 is pre-formed through a first step using a die block 10 (a first die) and a punch 30 (a second die), which are illustrated in FIGS. 1 to 3. Subsequently, the main forming of the metal plate 50 is performed in a second step using a die block 110 (a first die) and a punch 130 (a second die) shown in FIG. 7. The metal plate 50 is made of a highly corrosion resistant material, such as titanium, a titanium alloy, and a stainless steel. In the present embodiment, titanium is used.

First, the die block 10 and the punch 30, which are used in the first step, will be described.

As shown in FIG. 1, the die block 10 has a first shaping face 11 on the top surface, and the punch 30 has a second shaping face 31 on the bottom surface. The punch 30 is allowed to approach and move away from the die block 10.

As shown in FIGS. 1 to 3, and 6A, the first and second shaping faces 11, 31 of the die block 10 and the punch 30 have corrugated shapes that fit each other. When the punch 30 is moved toward the die block 10, the metal plate 50 is formed into a pre-formed body having a predetermined shape between the first shaping face 11 and the second shaping face 31 of the die block 10 and the punch 30.

Figure 4:
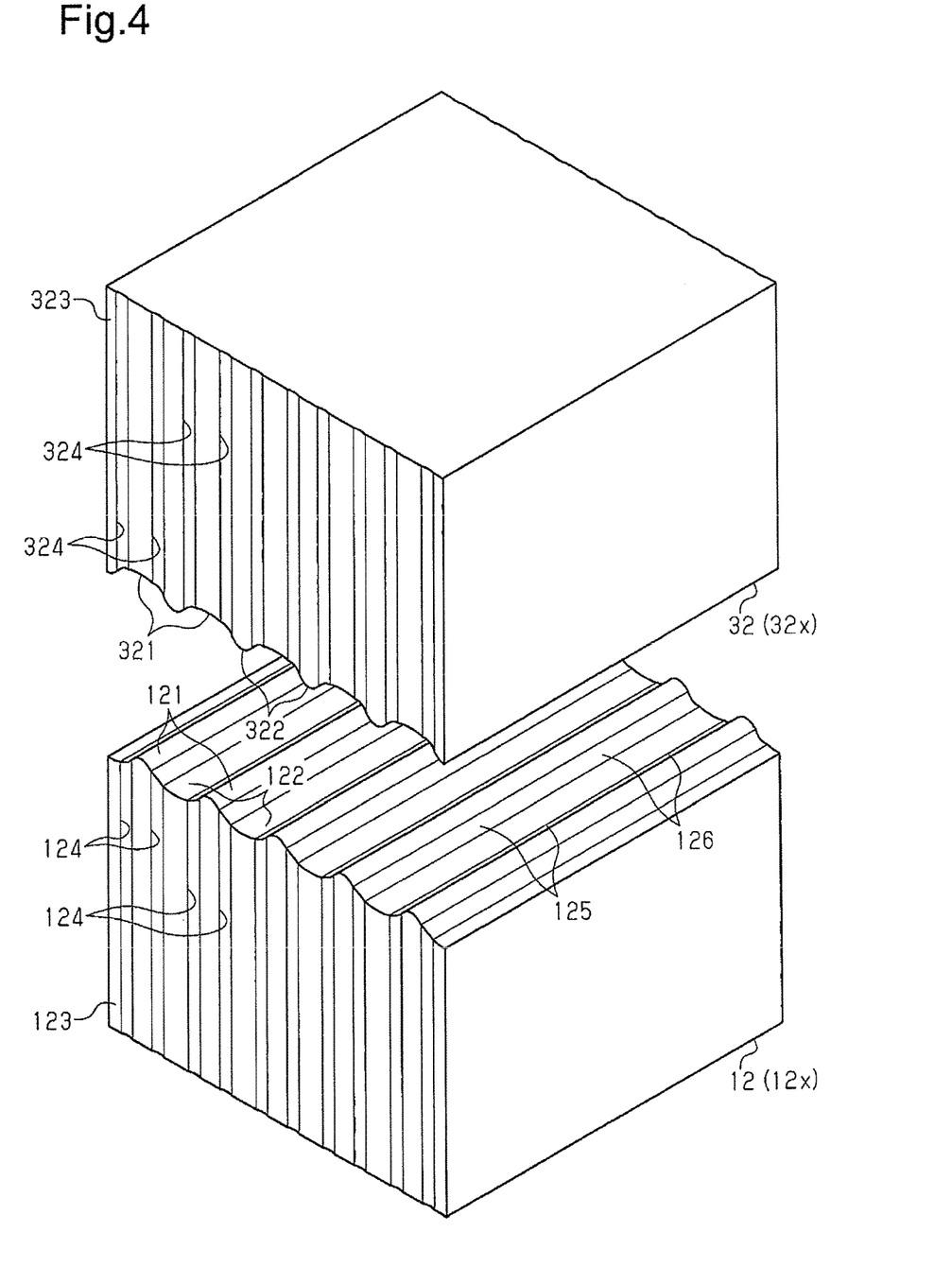
FIG. 4 is a perspective view illustrating a first die segment, which constitutes the die block shown in FIG. 1, and a second die segment, which constitutes the punch shown in FIG. 1, in a vertically separated state.

As shown in FIGS. 1, 2, and 4, the die block 10 is constituted by rectangular prism-shaped first die segments 12, 12x. The first die segments 12, 12x are made of a super hard metal such as high-speed steel.

As shown in FIGS. 1 and 2, the first die segments 12 are arranged in a frame 15, which is rectangular in a plan view. The first die segments 12 are placed on a base 16 via shims 17. The frame 15 and the base 16 are fixed to a support plate 18. The first die segments 12 form rows 12A, 12B, 12C, which extend in a predetermined direction (the lateral direction as viewed in FIGS. 1 and 2). As shown in FIG. 2, the rows 12A, 12B, 12C are arranged side by side in a direction perpendicular to the direction in which the rows extend. Each of the rows 12A, 12B, 12C includes a first die segment 12x that is shorter than the first die segments 12 in the direction in which the rows extend.

Figure 6A:
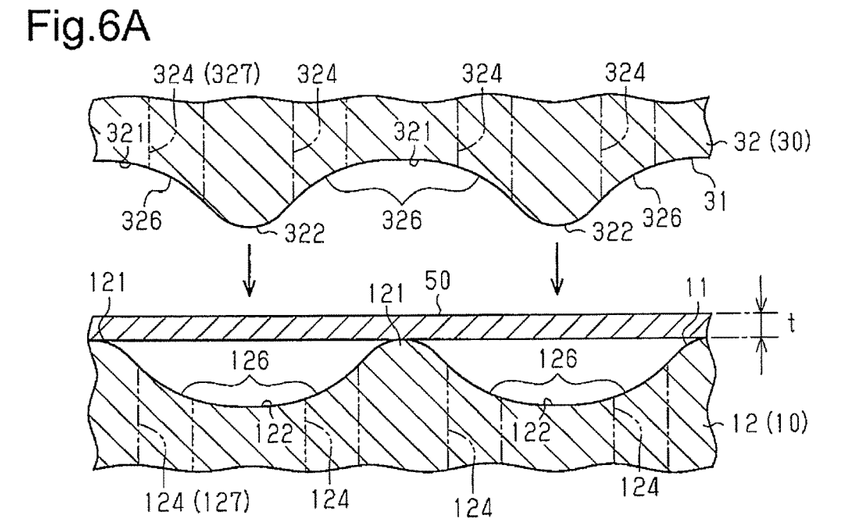
FIGS. 6A to 6C are cross-sectional views showing a process of a first step according to the embodiment.

As shown in FIGS. 4 and 6A, each of the first die segments 12 (12x) includes a first surface, on which first protruding portions 121 and first groove portions 122 are formed alternately. The first protruding portions 121 and the first groove portions 122 of the first die segments 12 (12x) each have a curved surface, so that a curved first inclined surface 126 is formed between each first protruding portion 121 and the adjacent first groove portion 122.

As shown in FIG. 2, the first die segments 12, 12x in each of the rows 12A, 12B, 12C are arranged such that the first protruding portions 121 and the first groove portions 122 are continuous. Accordingly, first protrusions 19 and first grooves 20 are formed on the first shaping face 11 of the die block 10.

As shown in FIG. 2, on the entire first shaping face 11 of the die block 10, the first protrusions 19 and the first grooves 20 are turned by 180 degrees at two sites of the ends of the first shaping face 11, that is, at first ends of the two rows 12B, 12C and at second ends of the two rows 12A, 12B on the opposite side from the first ends and extended continuously. Therefore, the first protruding portions 121 and the first groove portions 122 of the first die segments 12, 12x extend in a direction in which the rows 12A, 12B, 12C extend except for the first die segments 12, 12x at the first ends of the rows 12B, 12C and the second ends of the rows 12A, 12B.

In the present embodiment, the first protruding portions 121 and the first groove portions 122 are formed through cutting on the first surfaces of the first die segments 12, 12x, which are narrow in area. The first die segments 12, 12x are aligned such that the first protruding portions 121 and the first groove portions 122 of the first die segments 12, 12x are continuous. This forms the corrugated first shaping face 11.

As shown in FIGS. 4, 5A, 5C, and 6A, any two first die segments 12 (12x) that contact each other in the direction in which the first protruding portions 121 and the first groove portions 122 extend contact each other at first contacting surfaces 123. First communicating grooves 124 are formed on the first contacting surface 123 of each of the first die segments 12, 12x. Each first communicating groove 124 has an arcuate cross-sectional shape and communicates with the corresponding first inclined surface 126 of the first die segment. That is, the first contacting surfaces 123 of any two first die segments 12 (12x) that contact each other in the extending direction each have first communicating grooves 124. Each first communicating groove 124 on each first die segment 12 (12x) extends in the direction in which the punch 30 is moved (the vertical direction as viewed in FIGS. 6A to 6C) and to a second surface that is opposite from the first surface, on which the first inclined surface 126 is provided. As shown in FIG. 4, each first inclined surface 126 has a first guiding groove 125 over the entire first inclined surface 126 in the extending direction. The first guiding groove 125 has the same width as that of the first communicating groove 124.

Figure 5A:
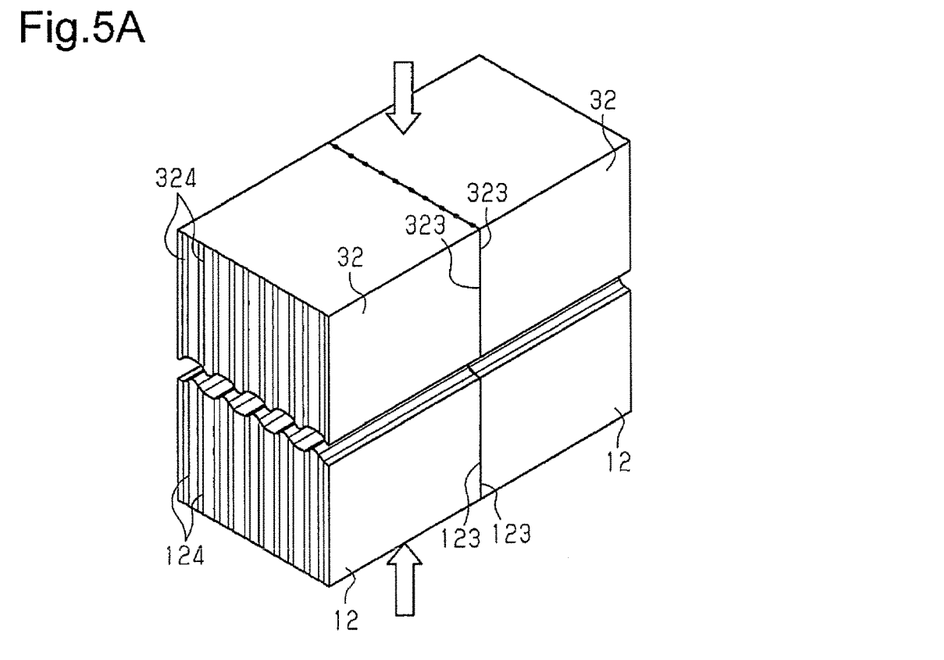
FIG. 5A is a perspective view illustrating two first die segments, which constitute the die block shown in FIG. 1, and two second die segments, which constitute the punch shown in FIG. 2, in a vertically separated state.
Figure 5B:
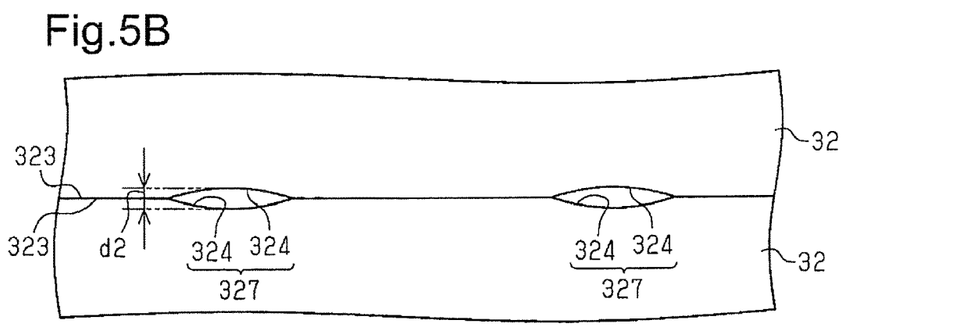
FIG. 5B is a partially enlarged top view of the punch of FIG. 1.
Figure 5C:
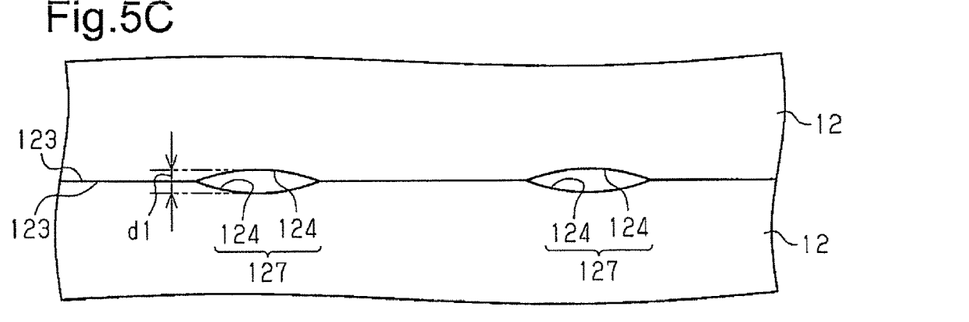
FIG. 5C is a partially enlarged bottom view of the die block of FIG. 1.

As shown in FIG. 5C, two facing first communicating grooves 124 formed in the first contacting surfaces 123 of any two of the first die segments 12 (12x) that contact each other in the extending direction form a first connecting passage 127. The maximum value d1 of the distance between the bottoms of two communicating grooves 124 that form a first connecting passage 127 is set to be smaller than the thickness t of the metal plate 50.

As illustrated on the left sides in FIGS. 1 and 2, a spacer member 21 is located between the frame 15 of the die block 10 and each first die segment 12x, which face each other in the longitudinal direction of the frame 15 (the lateral direction as viewed in FIGS. 1 and 2).

As illustrated on the upper side in FIG. 2, a spacer member 22 is located between the frame 15 and each of the first die segments 12, 12x in the row 12A, which face each other in the transverse direction of the frame 15 (the vertical direction as viewed in FIG. 2). The spacer members 21, 22 are fixed to the base 16 with screws 23.

As illustrated on the right sides in FIGS. 1 and 2, a wedge 24 is arranged between the frame 15 and each first die segment 12, which face each other in the longitudinal direction of the frame 15.

As illustrated on the lower side in FIG. 2, a wedge 25 is located between the frame 15 and each of the first die segments 12, 12x in the row 12C, which face each other in the transverse direction of the frame 15.

The wedges 24, 25 have the same structure and each have a first wedge member 26, which is arranged adjacent to the corresponding first die segment 12 (12x) and a second wedge member 27 arranged adjacent to the frame 15. As shown in FIGS. 1 and 2, each second wedge member 27 is fixed to the base 16 with screws 28.

The contacting surfaces of each first wedge member 26 and the corresponding second wedge member 27 are inclined to provide wedge effects. The wedge effects of the wedges 24, 25 fix the first die segments 12, 12x arranged in the longitudinal direction and the transverse direction inside the frame 15, while pressing the first die segments 12, 12x against the corresponding spacer members 21, 22.

As shown in FIGS. 3 and 4, the punch 30 is also constituted by rectangular prism-shaped second die segments 32, 32x, like the die block 10.

The punch 30, which has the second shaping face 31 shown in FIG. 3, has a horizontally mirrored structure of the die block 10 shown in FIG. 2. Except for this point and the shape of the second shaping face 31, the punch 30 has the same configuration as the die block 10. Thus, regarding the components that are the same or equivalent to the corresponding components in the die block 10, the components of the punch 30 are designated by numbers obtained by adding 20 to the number of signs designating the components of the die block 10, and redundant descriptions will be omitted.

As shown in FIGS. 4 and 6A, each of the second die segments 32 (32x) includes a first surface, on which second groove portions 321 and second protruding portions 322 are formed alternately. The second groove portions 321 and the second protruding portions 322 of the second die segments 32 (32x) each have a curved surface, so that a curved second inclined surface 326 is formed between each second groove portion 321 and the adjacent second protruding portion 322.

As shown in FIG. 3, the second die segments 32, 32x in each of the rows 32A, 32B, 32C are arranged such that the second groove portions 321 and the second protruding portions 322 are continuous. Accordingly, second grooves 39 and second protrusions 40 are formed on the second shaping face 31 of the punch 30.

In the present embodiment, the second groove portions 321 and the second protruding portions 322 are cut on the first surfaces of the second die segments 32, 32x that are narrow in area. The second die segments 32, 32x are aligned such that the second groove portions 321 and the second protruding portions 322 of the second die segments 32, 32x are continuous. This forms a corrugated second shaping face 31.

As shown in FIGS. 4, 5A, 5B, and 6A, any two second die segments 32 (32x) that contact each other in the direction in which the second groove portions 321 and the second protruding portions 322 extend contact each other at second contacting surfaces 323. Second communicating grooves 324 are formed on the second contacting surface 323 of each of the second die segments 32, 32x. Each second communicating groove 324 has an arcuate cross-sectional shape and communicates with the corresponding second inclined surface 326 of the second die segment. That is, the second contacting surfaces 323 of any two second die segments 32 (32x) that contact each other in the extending direction each have second communicating grooves 324. Each second communicating groove 324 on each second die segment 32 (32x) extends in the direction in which the punch 30 is moved (the vertical direction as viewed in FIGS. 6A to 6C) and to a second surface that is opposite from the first surface, on which the second inclined surface 326 is provided. Each second inclined surface 326 has a second guiding groove (not shown) over the entire second inclined surface 326 in the extending direction. The second guiding groove has the same width as that of the second communicating groove 324.

As shown in FIG. 5B, two facing second communicating grooves 324 formed in the second contacting surfaces 323 of any two of the second die segments 32 (32x) that contact each other in the extending direction form a second connecting passage 327. The maximum value d2 of the distance between the bottoms of two second communicating grooves 324 that form a second connecting passage 327 is set to be smaller than the thickness t of the metal plate 50.

Next, the die block 110 (a first die) and the punch 130 (a second die), which are used in the second step, will be described.

The die block 110 and the punch 130, which are used in the second step, have the same structure as the die block 10 (a first die) and the punch 30 (a second die), which are used in the first step, except for the shapes of the first and second shaping faces 13, 33 and the first and second communicating grooves 144, 344.

Figure 7A:
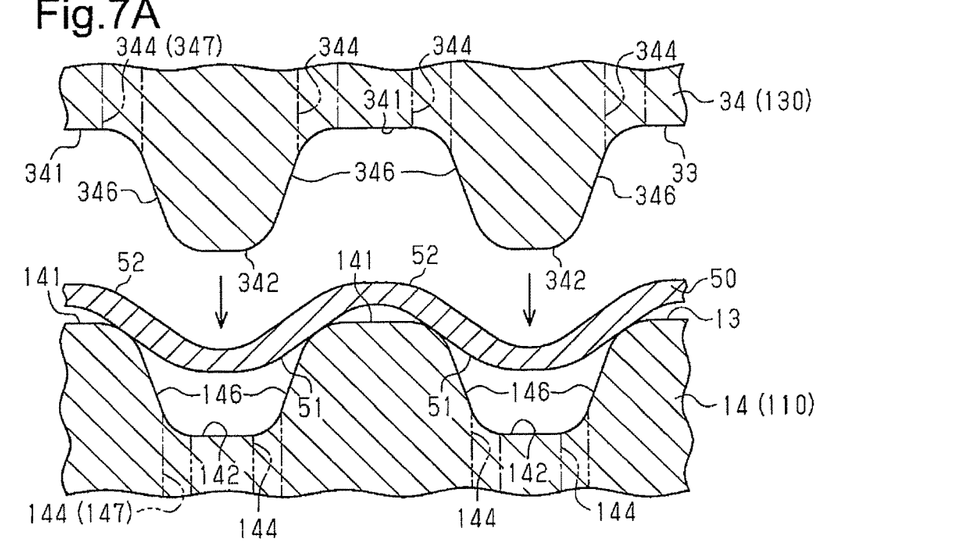
FIGS. 7A to 7C are cross-sectional views showing a process of a second step according to the embodiment.

As shown in FIG. 7A, each of the first die segments 14, which constitute the die block 110, includes a first surface, on which first protruding portions 141 and first groove portions 142 are formed alternately. The center of the top of each first protruding portion 141 and the center of the bottom of each first groove portion 142 are each formed by a flat surface that is perpendicular to the direction in which the punch 130 moves (the vertical direction as viewed in FIG. 7A). A first inclined surface 146 is formed between each first protruding portion 141 and the adjacent first groove portion 142. Each first protruding portion 141 has curved corners on opposite sides of the flat center portion on the top. Further, each first groove portion 142 has curved corners on opposite sides of the flat center portion on the bottom.

Any two first die segments 14 that contact each other in the direction in which the first protruding portions 141 and the first groove portions 142 extend contact each other at first contacting surfaces. First communicating grooves 144 are formed on the first contacting surface of each first die segment 14. Each first communicating groove 144 has an arcuate cross-sectional shape and communicates with the corresponding corner of the bottom of the corresponding first groove portion 142 of the first die segment 14. That is, the first contacting surfaces of any two first die segments 14 that contact each other in the extending direction each have first communicating grooves 144. Each first communicating groove 144 on each first die segment 14 extends in the direction in which the punch 130 is moved and to a second surface that is opposite from the first surface, on which the first groove portion 142 is provided. Each corner of the bottom of each first groove portion 142 has a first guiding groove (not shown) over the entire first groove portion 142 in the extending direction. The first guiding groove has the same width as that of the first communicating groove 144. Two facing first communicating grooves 144 formed in the first contacting surfaces of any two of the first die segments 14 that contact each other in the extending direction form a first connecting passage 147.

As shown in FIG. 7A, each of the second die segments 34, which constitute the punch 130, includes a first surface, on which second groove portions 341 and second protruding portions 342 are formed alternately. The center of the bottom of each second groove portion 341 and the center of the top of each second protruding portion 342 are each formed by a flat surface that is perpendicular to the direction in which the punch 130 moves (the vertical direction as viewed in FIG. 7A). A second inclined surface 346 is formed between each second groove portion 341 and the adjacent second protruding portion 342. Each second groove portion 341 has curved corners on opposite sides of the flat center portion on the bottom. Each second protruding portion 342 has curved corners on opposite sides of the flat center portion on the top.

Any two second die segments 34 that contact each other in the direction in which the second groove portions 341 and the second protruding portions 342 extend contact each other at second contacting surfaces. Second communicating grooves 344 are formed on the second contacting surface of each second die segment 34. Each second communicating groove 344 has an arcuate cross-sectional shape and communicates with the corresponding corner of the bottom of the corresponding second groove portion 341 of the second die segment 34. That is, the second contacting surfaces of any two second die segments 34 that contact each other in the extending direction each have second communicating grooves 344. Each second communicating groove 344 on each second die segment 34 extends in the direction in which the punch 130 is moved and to a second surface that is opposite from the first surface, on which the second groove portion 341 is provided. Each corner of the bottom of each second groove portion 341 has a second guiding groove (not shown) over the entire second groove portion 341 in the extending direction. The second guiding groove has the same width as that of the second communicating groove 344. Two facing second communicating grooves 344 formed in the second contacting surfaces of any two of the second die segments 34 that contact each other in the extending direction form a second connecting passage 347.

A forming method and operation according to the present embodiment will now be described.

Figure 6B:
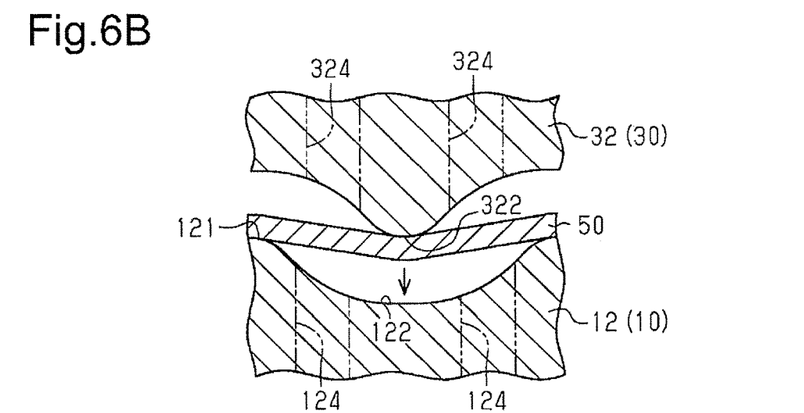
Figure 6C:
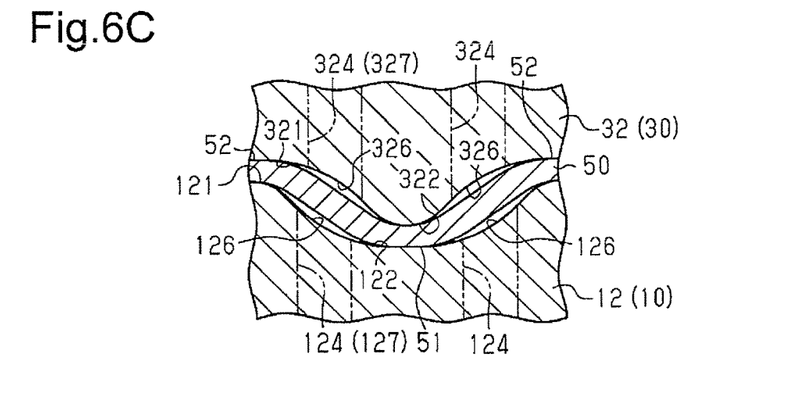

As shown in FIG. 6A, in the first step, machining oil is applied to the first and second shaping faces 11, 31 of the die block 10 and the punch 30 prior to the pressing operation. Then, with the flat metal plate 50 placed on the die block 10, the punch 30 is moved to approach the die block 10. Accordingly, as shown in FIGS. 6B and 6C, the metal plate 50 bulges at a predetermined interval on the back side (the lower side as viewed in FIGS. 6B and 6C) and the front side (the upper side as viewed in FIGS. 6B and 6C) between the set of the first protruding portions 121 and the first groove portions 122 of the die block 10 and the set of the second groove portions 321 and the second protruding portions 322 of the punch 30. This forms bulges 51, 52. At this time, the first inclined surfaces 126 of the die block 10 and the second inclined surfaces 326 of the punch 30 do not contact the metal plate 50, so that no compression stress acts on the first and second inclined surfaces 126, 326 during pressing of the metal plate 50. That is, the first shaping face 11 of the die block 10 and the second shaping face 31 of the punch 30 each include first regions and second regions. During pressing of the metal plate 50 by the die block 10 and the punch 30, the metal plate 50 is pressed against each first region, so that compression stress acts on the first region. In contrast, during the pressing, the metal plate 50 does not contact the second regions, so that no compression stress acts on the second regions. As shown in FIG. 6C, each first protruding portion 121 and each first groove portion 122 respectively form a first region on the first shaping face 11. Each first inclined surface 126 forms a second region on the first shaping face 11. Each second groove portion 321 and each second protruding portion 322 respectively form a first region on the second shaping face 31. Each second inclined surface 326 forms a second region on the second shaping face 31.

In the present embodiment, in the pressing operation, the machining oil retained on the first and second shaping faces 11, 31 of the die block 10 and the punch 30 is guided by the first guiding grooves 125 and the second guiding grooves (not shown) to be released to the first and second connecting passages 127, 327 (the first and second communicating grooves 124, 324). This restrains the fluid pressure of the machining oil from being increased. Thus, the occurrence of defects in shaping due to increase in the fluid pressure of the machining oil is suppressed.

Also, the first and second connecting passages 127, 327 communicate with the first and second inclined surfaces 126, 326, respectively. That is, the first and second connecting passages 127, 327 communicate with the second regions on the first and second shaping faces 11, 31, on which compression stress does not act during pressing of the metal plate 50. Thus, the metal plate 50 after being shaped has no traces of the first and second connecting passages 127, 327.

Figure 7B:
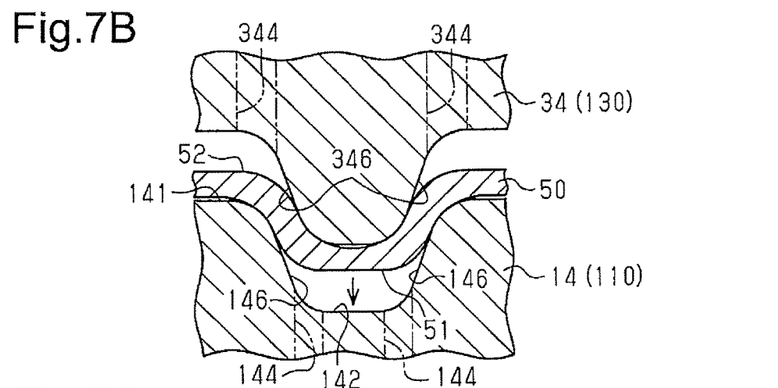
Figure 7C:
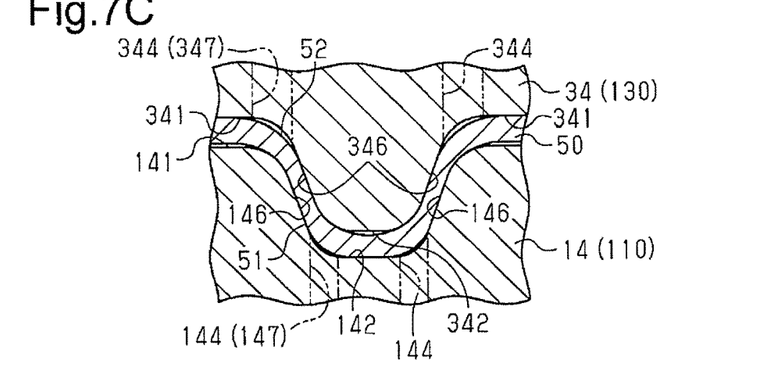

As shown in FIG. 7A, in the second step, machining oil is applied to the first and second shaping faces 13, 33 of the die block 110 and the punch 130 prior to the pressing operation. Then, with the metal plate 50, which has been pre-formed in the first step, placed on the die block 110, the punch 130 is moved to approach the die block 110. Accordingly, as shown in FIGS. 7B and 7C, the first inclined surfaces 146 of the die block 110 and the second inclined surfaces 346 of the punch 130 press and stretch the bulges 51, 52 in a squeezing manner. At this time, the metal plate 50 contacts neither of the corners on the bottom of the first groove portion 142 of the die block 110 nor the corners of the bottom of the second groove portion 341 of the punch 130. Therefore, no compression stress acts on the corners during pressing of the metal plate 50. That is, the first shaping face 13 of the die block 110 and the second shaping face 33 of the punch 130 each include first regions and second regions. During pressing of the metal plate 50 by the die block. 110 and the punch 130, the metal plate 50 is pressed against each first region, so that compression stress acts on the first region. In contrast, during the pressing, the metal plate 50 does not contact the second regions, so that no compression stress acts on the second regions. As shown in FIG. 7C, each first inclined surface 146 forms a first region on the first shaping face 13. Each corner of the bottom of each first groove portion 142 forms a second region on the first shaping face 13. Each second inclined surface 346 forms a first region on the second shaping face 33. Each corner of the bottom of each second groove portion 341 forms a second region on the second shaping face 33.

In the present embodiment, in the pressing operation, the machining oil retained on the first and second shaping faces 13, 33 of the die block 110 and the punch 130 is guided by the first and second guiding grooves (not shown) to be released to the first and second connecting passages 147, 347 (the first and second communicating grooves 144, 344). This restrains the fluid pressure of the machining oil from being increased. Thus, the occurrence of defects in shaping due to increase in the fluid pressure of the machining oil is suppressed.

Also, the first and second connecting passages 147, 347 communicate with the corners of the bottoms of the first and second groove portions 142, 341, respectively. That is, the first and second connecting passages 147, 347 communicate with the second regions on the first and second shaping faces 13, 33, on which compression stress does not act during pressing of the metal plate 50. Thus, the metal plate 50 after being shaped has no traces of the first and second connecting passages 147, 347.

The press die apparatus according to the above described embodiment has the following advantages. Since the advantages of the second step are equivalent to those of the first step, only the advantages of the first step will be described below and the description of the advantages of the second step will be omitted.

(1) The die block 10 is constituted by the first die segments 12, 12x, which are arranged side by side in parallel, and has the first shaping face 11, which is formed by the first die segments 12, 12x. The punch 30 is constituted by the second die segments 32, 32x, which are arranged side by side in parallel, and has the second shaping face 31, which is formed by the second die segments 32, 32x. Each of the first die segments 12, 12x has first contacting surfaces 123, which contact the adjacent first die segments 12 (12x). Each of the second die segments 32, 32x has second contacting surfaces 323, which contact the adjacent second die segments 32 (32x). Each first contacting surface 123 has first communicating grooves 124, which communicate with the first shaping face 11, and each second contacting surface 323 has second communicating grooves 324, which communicate with the second shaping face 31. That is, first communicating grooves 124 are formed on each of the first contacting surfaces 123 of any two adjacent first die segments 12 (12x), which contact each other. Also, second communicating grooves 324 are formed on each of the second contacting surface 323 of any two adjacent second die segments 32 (32x), which contact each other.

This configuration suppresses the occurrence of defects in shaping due to increase in the fluid pressure of the machining oil in the pressing operation. Also, compared to a case in which communicating holes are formed inside the die segments, passages for releasing machining oil can be easily formed. Thus, even in a case in which the metal plate 50 is thin, the occurrence of defects in shaping is easily suppressed.

(2) Two first communicating grooves 124 are formed to face each other on two first contacting surfaces 123 of two contacting first die segments 12 (12x) to form a first connecting passage 127, which communicates with the first shaping face 11. Two second communicating grooves 324 are formed to face each other on two second contacting surfaces 323 of two contacting second die segments 32 (32x) to form a second connecting passage 327, which communicates with the second shaping face 31.

Compared to a configuration in which communicating grooves are formed only on one of each contacting pair of die segments, the depth of the communicating grooves 124, 324 formed on each of the die segments 12, 12x, 32, 32x can be reduced. Accordingly, the strength of the die segments 12, 12x, 32, 32x is prevented from being lowered by forming the communicating grooves 124, 324.

Further, since the communicating grooves 124, 324 can be made shallow, the communicating grooves 124, 324 can be easily formed on the die segments 12, 12x, 32, 32x, which are made of a super hard metal, through cutting.

(3) The first shaping face 11 of the die block 10 and the second shaping face 31 of the punch 30 each include first regions and second regions. During pressing of the metal plate 50 by the die block 10 and the punch 30, the metal plate 50 is pressed against each first region, so that compression stress acts on the first region. In contrast, during the pressing, the metal plate 50 does not contact the second regions, so that no compression stress acts on the second regions. Each first communicating groove 124 communicates with the corresponding first inclined surface 126, that is, a second region on the first shaping face 11. Each second communicating groove 324 communicates with the corresponding second inclined surface 326, that is, a second region on the second shaping face 31. Thus, it is possible to reliably prevent the metal plate 50 after being shaped from having traces of the communicating grooves 124, 324.

(4) The maximum value d1 of the distance between the bottoms of two first communicating grooves 124 that form a first connecting passage 127 is set to be smaller than the thickness t of the metal plate 50. The maximum value d2 of the distance between the bottoms of two second communicating grooves 324 that form a second connecting passage 327 is set to be smaller than the thickness t of the metal plate 50. Thus, it is possible to reliably prevent the metal plate 50 after being shaped from having traces of the communicating grooves 124, 324.

(5) Each first inclined surface 126, that is, each second region on the first shaping face 11, on which no compression stress acts during pressing of the metal plate 50, has a first guiding groove 125, which is continuous with a first communicating groove 124. Each second inclined surface 326, that is, each second region on the second shaping face 31, on which no compression stress acts during pressing of the metal plate 50, has a second guiding groove (not shown), which is continuous with a communicating groove 324. This configuration smoothly guides machining oil retained on the shaping faces 11, 31 to the communicating grooves 124, 324.

(6) The die block 10 is constituted by the first die segments 12, 12x. The punch 30 is constituted by the second die segments 32, 32x.

The die block 10 and the punch 30 are made of a super hard metal such as high-speed steel. Thus, the cutting tool for forming the first and second shaping faces 11, 31 is easily blunted. Thus, if the die block and the punch are not constituted by segments like the present embodiment, it is difficult to form the undulated structure on the shaping face in a single cutting operation in the extending direction with a single cutting tool.

In this regard, according to the above configuration, since the die block 10 and the punch 30 are constituted by the die segments 12, 12x, 32, 32x, the area of the shaping face that is cut by a single cutting tool is small. This facilitates the cutting operation of the shaping faces 11, 31 of the die block 10 and the punch 30.

MODIFICATIONS

The above described embodiment may be modified as follows.

The guiding grooves 125 may be omitted.

As long as the traces of the communicating grooves can be reliably prevented from remaining on the metal plate after being shaped, communicating grooves may communicate with first regions on a shaping face, against which a metal plate is pressed and on which compression stress acts during pressing of the metal plate.

First communicating grooves 124 may be formed on the first contacting surface 123 of one of each contacting pair of the first die segments 12 (12x). Second communicating grooves 324 may be formed on the second contacting surface 323 of one of each contacting pair of the second die segments 32 (32x).

The press die apparatus of the present invention may be applied to pressing processes for metal products other than separators for fuel cells.

The invention claimed is:

1. A press die apparatus for pressing a metal plate, the apparatus comprising:
a first die, which is configured by a plurality of first die segments arranged side by side, wherein the first die has a first shaping face constituted by the first die segments; and
a second die, which is configured by a plurality of second die segments arranged side by side, wherein the second die has a second shaping face constituted by the second die segments, wherein
each first die segment includes a first contacting surface, which contacts adjacent one of the first die segments,
each second die segment includes a second contacting surface, which contacts adjacent one of the second die segments,
the first die segments include a plurality of pairs of first die segments, wherein the first die segments in each pair contact each other at the first contacting surfaces,
the first contacting surface of at least one of each pair of the first die segments has a first communicating groove, which communicates with the first shaping face,
the second die segments include a plurality of pairs of second die segments, wherein the second die segments in each pair contact each other at the second contacting surfaces, and the second contacting surface of at least one of each pair of the second die segments has a second communicating groove, which communicates with the second shaping face.

2. The press die apparatus according to claim 1, wherein two of the first communicating grooves are provided to face each other on the first contacting surfaces of each pair of the first die segments, two of the second communicating grooves are provided to face each other on the second contacting surfaces of each pair of the second die segments, the two first communicating grooves, which are provided in each pair of the first die segments to face each other, form a first connecting passage, which communicates with the first shaping face, and the two second communicating grooves, which are provided in each pair of the second die segments to face each other, form a second connecting passage, which communicates with the second shaping face.

3. The press die apparatus according to claim 1, wherein each of the first shaping face and the second shaping face includes
 a first region, which is pressed against the metal plate and receives compression stress during pressing of the metal plate performed by the first die and the second die, and
 a second region, which does not contact the metal plate and receives no compression stress during the pressing,
each first communicating groove communicates with the second region of the first shaping face, and
each second communicating groove communicates with the second region of the second shaping face.

4. The press die apparatus according to claim 3, wherein the first shaping face includes a first guiding groove, which is formed in the second region of the first shaping face, and
the first guiding groove is continuous with each first communicating groove.

5. The press die apparatus according to claim 3, wherein each first die segment includes
 a plurality of first protruding portions and a plurality of first groove portions, which are arranged alternately and form the first shaping face, and
 a plurality of first inclined surfaces, each of which is located between one of the first protruding portions and adjacent one of the first groove portions,
the second region of the first shaping face is one of a plurality of second regions,
each first inclined surface constitutes one of the second regions of the first shaping face,
each second die segment includes
 a plurality of second protruding portions and a plurality of second groove portions, which are arranged alternately and form the second shaping face, and
 a plurality of second inclined surfaces, each of which is located between one of the second protruding portions and adjacent one of the second groove portions,
the second region of the second shaping face is one of a plurality of second regions,
each second inclined surface constitutes one of the second regions of the second shaping face,
each first communicating groove communicates with corresponding one of the first inclined surfaces, and
each second communicating groove communicates with corresponding one of the second inclined surfaces.

6. The press die apparatus according to claim 3, wherein each first die segment includes a plurality of first protruding portions and a plurality of first groove portions, which are arranged alternately and form the first shaping face,
each first groove portion includes a bottom,
the second region of the first shaping face is one of a plurality of second regions,
the bottom of each first groove portion includes a corner, which constitutes one of the second regions of the first shaping face,
each second die segment includes a plurality of second protruding portions and a plurality of second groove portions, which are arranged alternately and form the second shaping face,
each second groove portion includes a bottom,
the second region of the second shaping face is one of a plurality of second regions,
the bottom of each second groove portion includes a corner, which constitutes one of the second regions of the second shaping face,
each first communicating groove communicates with the corner of the bottom of corresponding one of the first groove portions, and
each second communicating groove communicates with the corner of the bottom of corresponding one of the second groove portions.

* * * * *